C. E. CAMPBELL.
BALL BEARING.
APPLICATION FILED NOV. 22, 1919.
1,408,266. Patented Feb. 28, 1922.
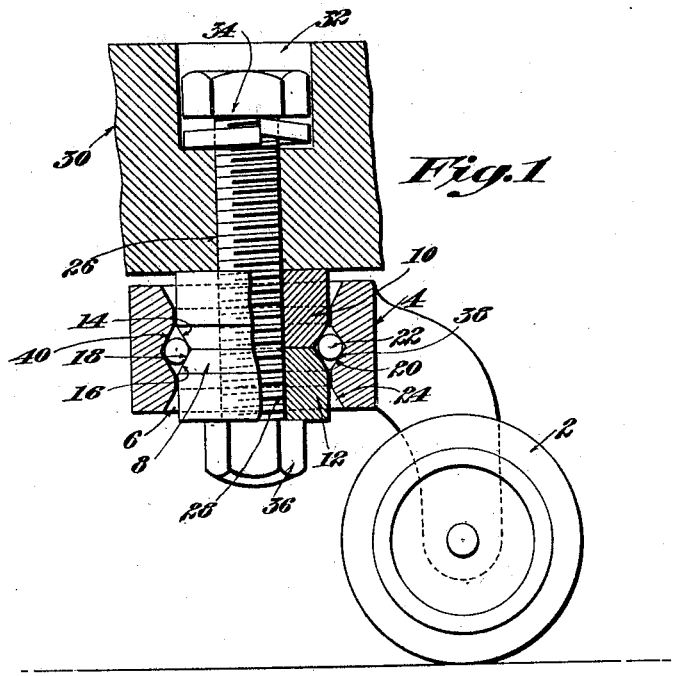
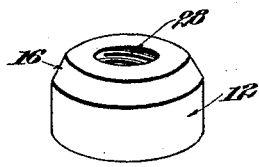
Witness
M. G. Crozier
Inventor
Charles Edward Campbell
by his attorneys
Van Everen Fish & Hildreth

UNITED STATES PATENT OFFICE.

CHARLES EDWARD CAMPBELL, OF LYNN, MASSACHUSETTS.

BALL BEARING.

1,408,266.    Specification of Letters Patent.    Patented Feb. 28, 1922.

Application filed November 22, 1919. Serial No. 340,046.

*To all whom it may concern:*

Be it known that I, CHARLES EDWARD CAMPBELL, a citizen of the United States, residing at Lynn, in the county of Essex and State of Massachusetts, have invented certain new and useful Improvements in Ball Bearings, and I do hereby declare the following to be a full, clear, and exact description of the invention, such as will enable others skilled in the art to which it appertains to make and use the same.

This invention relates to ball bearings and to ball-bearing casters, and more particularly to ball-bearing casters adapted for use upon heavy articles, such as articles of furniture, cabinets, trucks and the like.

Casters of the ordinary type are unsatisfactory because of the tendency of their supporting parts to bind, preventing the free turning of the supports and causing the caster to drag sidewise over the floor. It has accordingly been proposed to provide casters with one or more sets of ball bearings so as to prevent their binding, and to cause them to turn more freely. The casters comprising a plurality of sets of ball bearings are very cumbersome and add greatly to the cost of manufacture. The casters hitherto employed which comprise but one set of ball bearings have not entirely solved the problem because parts of the caster structure still bind.

An object of the present invention is to provide an improved caster comprising but a single set of ball bearings and so constructed that the whole weight or friction shall be taken up by the balls.

A second object of the invention is to simplify the construction of casters, rendering them more efficient and cheapening their cost of manufacture.

A third object of the invention is to provide an improved ball-bearing unit of general utility.

To the attainment of the above-mentioned objects and such others as will hereinafter appear, the invention consists of the improved ball-bearing and the improved caster herein described, illustrated in the drawings and defined in the appended claims.

In the accompanying drawings, Figure 1 is a vertical sectional view of the improved caster constituting the preferred embodiment of the present invention, and Fig. 2 is a perspective view of one of the base elements.

The preferred form of the invention is illustrated as comprising the usual floor wheel 2 rotatably secured to a support 4 having a circular opening 6 within which is mounted a base 8. The base 8 is constituted of two cylindrical base elements 10 and 12 placed end to end, with the adjacent ends bevelled, as shown at 14 and 16, to form an outer circumferential V-shaped race 18. The surface wall of the opening 6 and the surface of the base 8 may take the shapes of any desired surfaces of revolution, as will be obvious. The wall of the circular opening 6 is interiorly provided with a V-shaped race 20 disposed opposite to the race 18. A single set of ball bearings 22 is mounted within the races 18 and 20, serving not only as the sole anti-friction means, but also to space the wall of the opening 6 from the exterior cylindrical surface of the base 8, preventing the wall surface from binding upon the base surface. In order the better to prevent such binding effects, the adjacent surfaces may be cut away one from the other. In the present embodiment of the invention, the wall surface is shown as cut away or bevelled at 24.

After the ball bearings have been placed in position, and the elements 10 and 12 have been assembled to confine the ball bearings within the races 18 and 20, a screw bolt 26 is inserted through openings 28 of the elements. The screw bolt is secured in any desired manner to the bottom of the cabinet or other article 30 which the caster is designed to support. In the preferred embodiment of the invention, as shown, the screw bolt is mounted within an opening 32 of the article 30, and the base 8 is rigidly secured to the article 30 by a lock nut 34 at one end of the screw bolt and a cap screw 36 at the other end.

The support 4, it will be noticed, does not contact anywhere with the article 30. The weight of the article 30 is received upon all the ball bearings and the thrust is received upon diagonally oppositely situated ball bearings at the points 38 and 40, so that the support 4 is freely rotatable about the base 8 without binding effects.

It will be understood that the invention is not restricted to the illustrated embodiment thereof, but is of broader scope, limited only in so far as limitations may be expressly imposed in the appended claims.

I claim—

1. A ball-bearing for supporting heavy articles comprising an outer rotatable member having a central opening and a V-shaped raceway extended around the wall of the opening, an inner stationary member comprising a threaded shaft, two collars screwed thereon having adjacent ends bevelled and in abutment to form a second V-shaped raceway, and a set of balls received within both raceways, said collars being of sufficient length to extend beyond the top and bottom of the outer rotatable member to thereby permit the inner stationary member to be rigidly clamped to the article to be supported by the bearing and to also afford clearance between the outer rotatable member and the article to be supported so that the weight of the article is transmitted to the outer member solely through the balls.

2. A ball-bearing for supporting heavy articles comprising an outer rotatable member having a central opening and a V-shaped raceway extended around the wall of the opening, an inner stationary member comprising a shaft, two members mounted on the shaft having adjacent ends bevelled and in abutment to form a second V-shaped raceway, and a set of balls received within both raceways, said members being of a length sufficient to extend beyond the top and bottom of the outer member to permit the inner stationary member to be rigidly clamped by the shaft to the article to be supported by the bearing and to also afford clearance between the upper rotatable member and the article to be supported so that the weight of the article is transmitted to the outer member solely through the balls.

CHARLES EDWARD CAMPBELL.